United States Patent
Siram (10) Patent No.: US 10,331,774 B2
(45) Date of Patent: Jun. 25, 2019

(54) SYSTEM AND METHODS FOR DESIGNING ARTIFACTS ASSOCIATED WITH A WEBPAGE

(71) Applicant: Tata Consultancy Services Limited, Mumbai (IN)

(72) Inventor: Subbarao Siram, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 19 days.

(21) Appl. No.: 14/187,060

(22) Filed: Feb. 21, 2014

(65) Prior Publication Data
US 2015/0067480 A1 Mar. 5, 2015

(30) Foreign Application Priority Data
Sep. 5, 2013 (IN) .......................... 2887/MUM/2013

(51) Int. Cl.
*G06F 8/00* (2018.01)
*G06F 8/20* (2018.01)
(Continued)

(52) U.S. Cl.
CPC .............. *G06F 17/24* (2013.01); *G06F 8/20* (2013.01); *G06F 8/30* (2013.01); *G06F 16/958* (2019.01);
(Continued)

(58) Field of Classification Search
CPC .... G06F 17/24; G06F 17/3089; G06F 17/211; G06F 8/00; G06F 3/0481; G06F 3/0482;
(Continued)

(56) References Cited

U.S. PATENT DOCUMENTS 8,392,828 B2 3/2013 Yoo et al.
2004/0103371 A1* 5/2004 Chen ................. G06F 17/30905
715/205
(Continued)

FOREIGN PATENT DOCUMENTS

CN 102207872 10/2011
EP 0564790 10/1993
EP 0944007 9/1999

OTHER PUBLICATIONS

Intellij Idea 12.1.0 Web Help, "Adding and Editing Layout Components Using Android" downloaded from https://www.jetbrains.com/idea/webhelp/adding-and-editing-layout-components-using-android-ui-designer.html on Feb. 21, 2014 (3 pages).
(Continued)

*Primary Examiner* — Quoc A Tran
(74) *Attorney, Agent, or Firm* — Finnegan, Henderson, Farabow, Garrett & Dunner LLP (57) ABSTRACT

The present disclosure generally relates to systems and methods for designing webpage and, more particularly, to systems and methods for designing artifacts associated with a webpage in a web development environment. In one embodiment, a system for designing artifacts associated with a webpage is provided. The system may identify a style pattern based on an HTML pattern of the webpage and one or more boundary conditions. The system may also determine one or more editing operations to be performed on the artifacts based on one or more style specifications. The system may further perform the one or more determined editing operations on the artifacts based a value associated with one or more of the artifacts, the style pattern, and the boundary conditions, and render design of the artifacts based on the performance of the editing operations.

9 Claims, 5 Drawing Sheets

(51) Int. Cl.

| | |
|---|---|
| *G06F 8/30* | (2018.01) |
| *G06F 8/34* | (2018.01) |
| *G06F 8/38* | (2018.01) |
| *H04M 1/57* | (2006.01) |
| *H04N 5/44* | (2011.01) |
| *G06F 17/21* | (2006.01) |
| *G06F 17/22* | (2006.01) |
| *G06F 17/24* | (2006.01) |
| *H04N 5/445* | (2011.01) |
| *G06F 16/958* | (2019.01) |
| *G06F 3/0482* | (2013.01) |
| *G06F 17/00* | (2019.01) |

(52) U.S. Cl.
CPC .......... *G06F 17/211* (2013.01); *G06F 3/0482* (2013.01); *G06F 8/00* (2013.01); *G06F 8/34* (2013.01); *G06F 8/38* (2013.01); *G06F 17/227* (2013.01); *G06F 17/2247* (2013.01); *H04M 1/57* (2013.01); *H04N 5/4401* (2013.01); *H04N 5/445* (2013.01)

(58) Field of Classification Search
CPC .... G06F 17/2247; G06F 17/227; H04M 1/57; H04N 5/445; H04N 5/4401; F06F 17/2247; F06F 17/227; F06F 8/38

USPC ......................................... 715/236, 788, 815
See application file for complete search history.

(56) References Cited

U.S. PATENT DOCUMENTS

| | | | |
|---|---|---|---|
| 2005/0132284 A1* | 6/2005 | Lloyd .................. | G06F 17/211 715/236 |
| 2008/0120538 A1* | 5/2008 | Kurz ................. | G06F 17/30905 715/255 |
| 2009/0138810 A1* | 5/2009 | Howard ................ | G06F 3/0481 715/760 |
| 2009/0147297 A1* | 6/2009 | Stevenson ............... | G06T 11/60 358/1.15 |
| 2010/0251143 A1 | 9/2010 | Thomas et al. | |
| 2011/0107227 A1* | 5/2011 | Rempell ................ | H04L 51/046 715/738 |
| 2013/0124968 A1* | 5/2013 | Dontcheva ............ | G06F 17/212 715/234 |
| 2016/0232141 A1* | 8/2016 | Fischer ................ | G06F 17/2247 |

OTHER PUBLICATIONS

W3C Incubator Group Report, "Model-Based UI XG Final Report", May 4, 2010 (25 pages).

* cited by examiner

SYSTEM AND METHODS FOR DESIGNING ARTIFACTS ASSOCIATED WITH A WEBPAGE

PRIORITY CLAIM

This U.S. patent application claims priority under 35 U.S.C. § 119 to India Application No. 2887/MUM/2013, filed Sep. 5, 2013. The aforementioned application is incorporated herein by reference in its entirety.

TECHNICAL FIELD

The present disclosure generally relates to systems and methods for designing a webpage and, more particularly, to systems and methods for designing artifacts associated with a webpage in a web development environment.

BACKGROUND

In developing web-based applications, features may depend on code structures. For example, features may be based on writing codes and modifying codes. Designing of webpages is becoming more advanced because many features may be customized according to the user's requirements. Moreover, a user may control the design of various artifacts and may modify the artifacts based on the requirements. However, designing features for web application involves generation of generalized code and thus modifying the artifacts may create additional complexity.

Traditionally, to provide user-customized style specifications, methods for updating code to provide a user specific web application may be used. However, these methods may also have certain drawbacks. For example, updating code may bloat the code generators. Updating code may also conflict with the generic nature of code generation strategies, which may lead to maintenance problems for product lines. Moreover, the process for updating code may also require additional time overhead for testing. Further, the process of updating code associated with web development may also cause browser compatibility issues. In general, the above described issues may be referred to as scripting and styling issues.

SUMMARY

This summary is provided to introduce aspects related to systems and methods for designing artifacts associated with a webpage in a web development environment, and the aspects are further described below in the detailed description. This summary is not intended to identify essential features of the claimed subject matter nor is it intended for use in determining or limiting the scope of the claimed subject matter.

In one embodiment, a system for designing artifacts associated with a webpage is provided. The system may include one or more processors and a memory storing processor-executable instructions that, when executed by the one or more processors, configure the one or more processors to: identify a style pattern based on an HTML pattern of the webpage and one or more boundary conditions specified by the user; determine one or more editing operations to be performed on the artifacts based on one or more style specifications specified by the user; perform the one or more determined editing operations on the artifacts based on values associated with at least one of the artifacts, the style pattern, and the boundary conditions; and render a design of the artifacts based on the performance of the editing operations.

In one embodiment, a method for designing artifacts associated with a webpage is provided. The method may include identifying, by one or more processors executing programmed instructions stored in a memory, a style pattern based on an HTML pattern of the webpage and one or more boundary conditions specified by the user; determining, by the one or more processors, one or more editing operations to be performed on the artifacts based on one or more style specifications specified by the user; performing, by the one or more processors, the one or more determined editing operations on the artifacts based on values associated with at least one of the artifacts, the style pattern, and the boundary conditions; and rendering, by the one or more processors, a design of the artifacts based on the performance of the editing operations.

In one embodiment, a non-transitory computer program product having embodied thereon computer program instructions for designing artifacts associated with a webpage is provided. The computer program instructions may include instructions for configuring a processor to perform operations comprising: identifying a style pattern based on an HTML pattern of the webpage and one or more boundary conditions specified by the user; determining one or more editing operations to be performed on the artifacts based on one or more style specifications specified by the user; performing the one or more determined editing operations on the artifacts based on values associated with at least one of the artifacts, the style pattern, and the boundary conditions; and rendering a design of the artifacts based on the performance of the editing operations.

DETAILED DESCRIPTION

Exemplary embodiments are described with reference to the accompanying drawings. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. The words "comprising", "having", "containing", and "including", and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a", "an", and "the" include plural references unless the context clearly dictates otherwise. Although any systems, methods, apparatuses, and devices similar or equivalent to those described herein can be used in the practice or testing of embodiments of the present disclosure, exemplary systems and parts are now described. In the following description, for the purpose of explanation and understanding, reference has been made to embodiments for which the intent is not to limit the scope of the claimed subject matter.

Embodiments of systems, methods, and computer program products for designing artifacts associated with a webpage are disclosed. For example, a user may customize a webpage by selecting one or more values of the artifacts. The user may also specify certain boundary conditions for the design of the artifacts. The boundary conditions and a Hyper Text Markup Language (HTML) pattern of the webpage may be used to specify a style pattern. The style pattern, the boundary conditions, and the values of the artifacts may be processed to execute one or more editing operations on the artifacts. The editing operations may also be controlled by referring to a style specification as specified by the user.

While aspects of the described systems and methods for designing artifacts of a webpage may be implemented in any number of different computing systems, environments, and/or configurations, the embodiments are described in the context of the following exemplary system.

Figure 1:
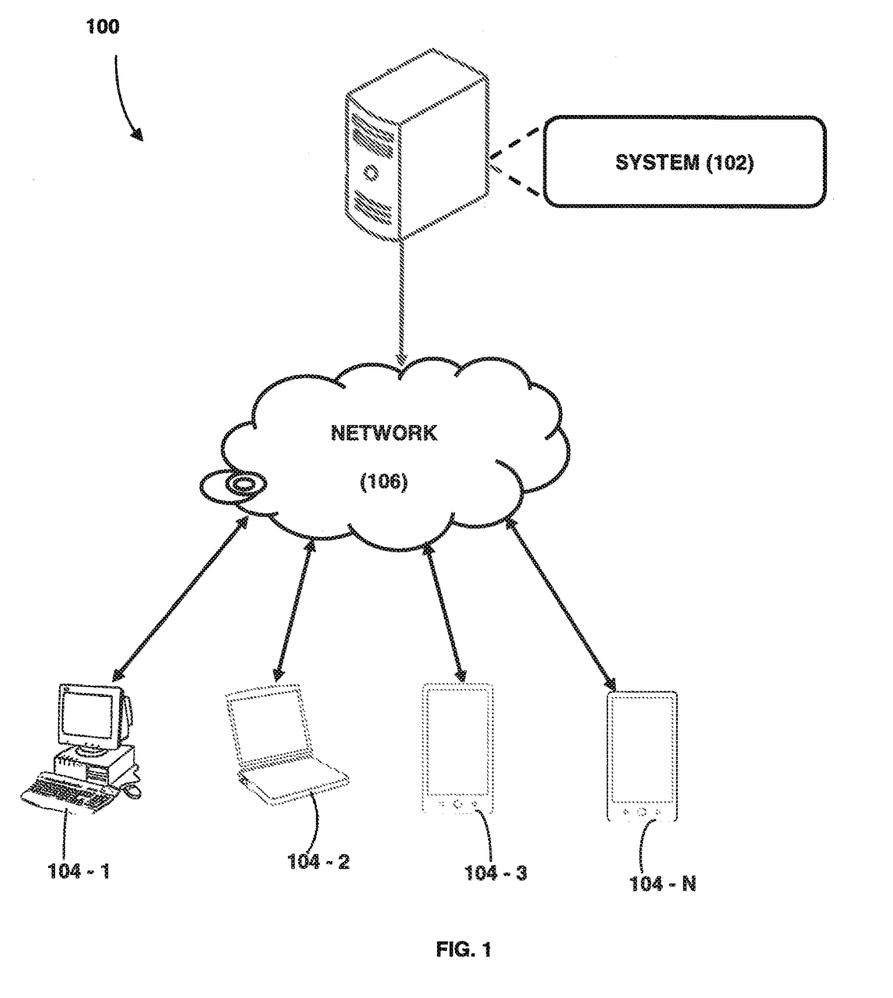
FIG. 1 illustrates an exemplary network environment including a system for designing artifacts, in accordance with an embodiment of the present disclosure.

FIG. 1 illustrates an exemplary network environment 100 including a system 102 for designing artifacts of a webpage. A user may customize the webpage based on the user's requirement. For example, the user may customize the webpage by designing various artifacts of the webpage. The system 102 may receive inputs in a form of, for example, boundary conditions and values of artifacts. In some embodiments, editing operations may be performed on the artifacts and design changes may be displayed as a preview to the user in real time. The design of the artifacts may be customized at any stage by the user.

In the present subject matter, while the system 102 may be implemented using an application on a server, it is appreciated that the system 102 may also be implemented in a variety of computing systems, such as a laptop computer, a desktop computer, a notebook, a workstation, a mainframe computer, a server, a network server, etc. It is also appreciated that the system 102 may be accessed by multiple users through one or more user devices 104-1, 104-2, . . . 104-N (collectively referred to as user devices 104 hereinafter) or applications residing on the user devices 104. Examples of the user devices 104 may include, but are not limited to, a portable computer, a personal digital assistant, a handheld device, and a workstation. The user devices 104 may be communicatively coupled to the system 102 through a network 106.

In one embodiment, the network 106 may be at least one of a wireless network and a wired network. The network 106 can be implemented as one or more of the different types of networks, such as intranet, local area network (LAN), wide area network (WAN), the Internet, etc. The network 106 may either be a dedicated network or a shared network. The shared network may represent an association of the different types of networks that use a variety of protocols (e.g., Hypertext Transfer Protocol (HTTP), Transmission Control Protocol/Internet Protocol (TCP/IP), Wireless Application Protocol (WAP), etc.) to communicate with one another. Further, the network 106 may include a variety of network devices, including, for example, routers, bridges, servers, computing devices, storage devices, etc.

Figure 2:
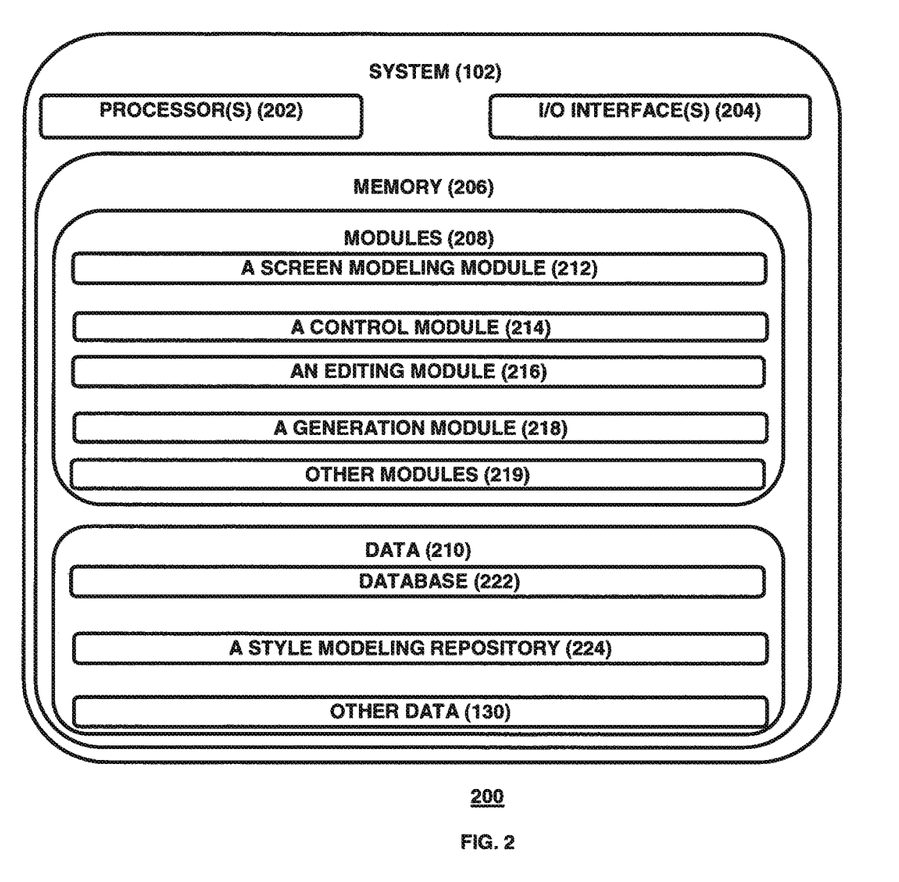
FIG. 2 illustrates an exemplary system for designing artifacts in accordance with an embodiment of the present disclosure.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks (e.g., LAN, cable network, etc.) and wireless networks(e.g., WLAN, cellular networks, and/or satellite networks). The I/O interface 204 may include one or more ports for connecting a number of devices to one another or to another server.

The memory 206 may include any non-transitory computer-readable medium including, for example, volatile memory (e.g., static random access memory (SRAM) and dynamic random access memory (DRAM)) and/or non-volatile memory (e.g., read only memory (ROM), erasable programmable ROM, flash memories, hard disks, optical disks, and magnetic tapes). The memory 206 may include modules 208 and data 210.

The modules 208 may include routines, programs, objects, components, data structures, etc., which may perform particular tasks or implement particular abstract data types. In one embodiment, the modules 208 may include a screen modeling module 212, a control module 214, an editing module 216, a generating module 218, and/or other modules 219. The other modules 219 may include programs or coded instructions that supplement applications and functions of the system 102.

The data 210, in some embodiments, may serve as a repository for storing data processed, received, and/or generated by one or more of the modules 208. The data 210 may also include a database 222, a style modeling repository 214, and/or other data 130. The other data 130 may include data generated as a result of the execution of one or more modules in the other modules 219.

Figure 3:
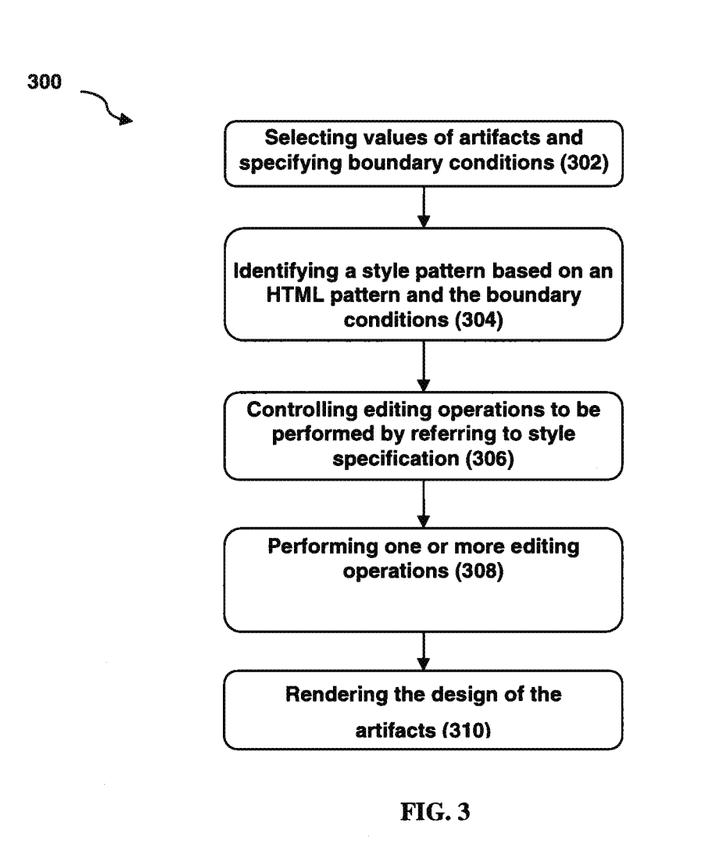
FIG. 3 is a flow chart illustrating an exemplary method for designing artifacts in accordance with an embodiment of the present disclosure.
Figure 4:
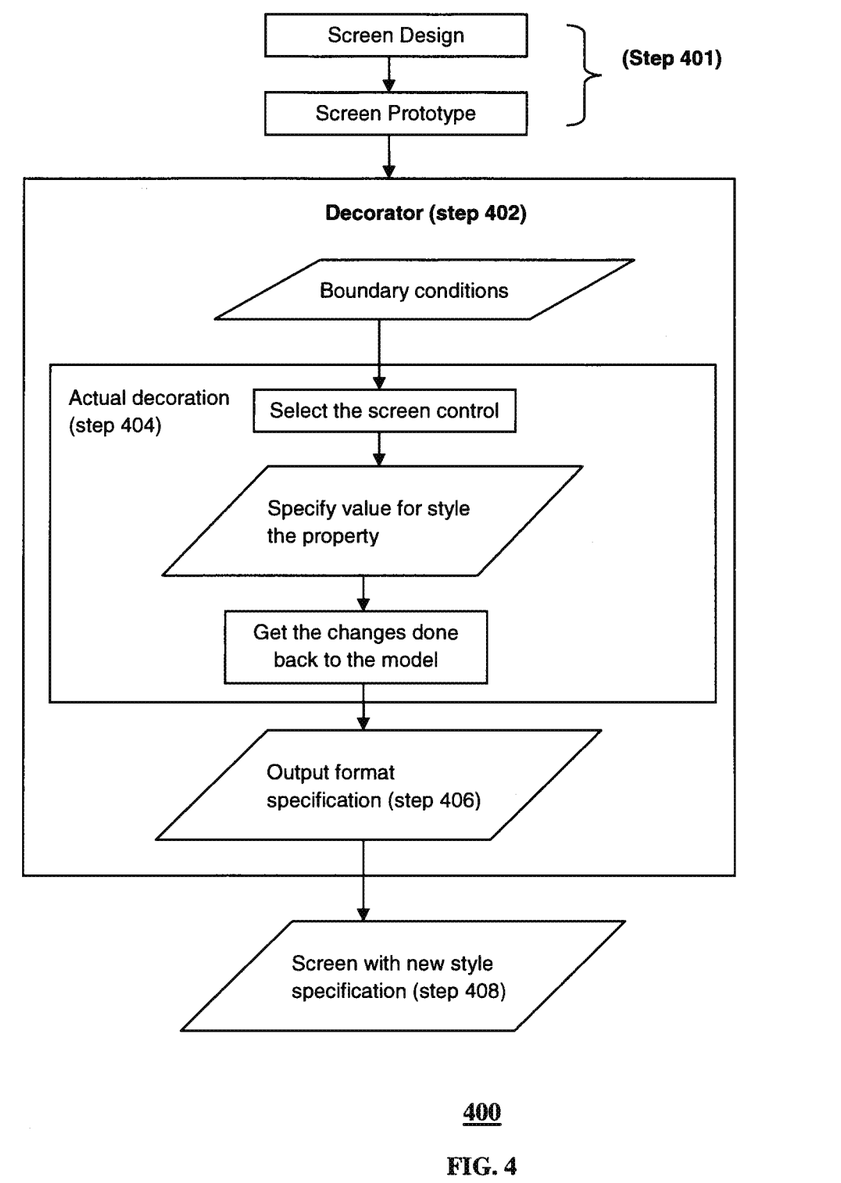
FIG. 4 is a flow chart illustrating an exemplary method for designing artifacts of a webpage in accordance with an embodiment of the present disclosure.
Figure 5:
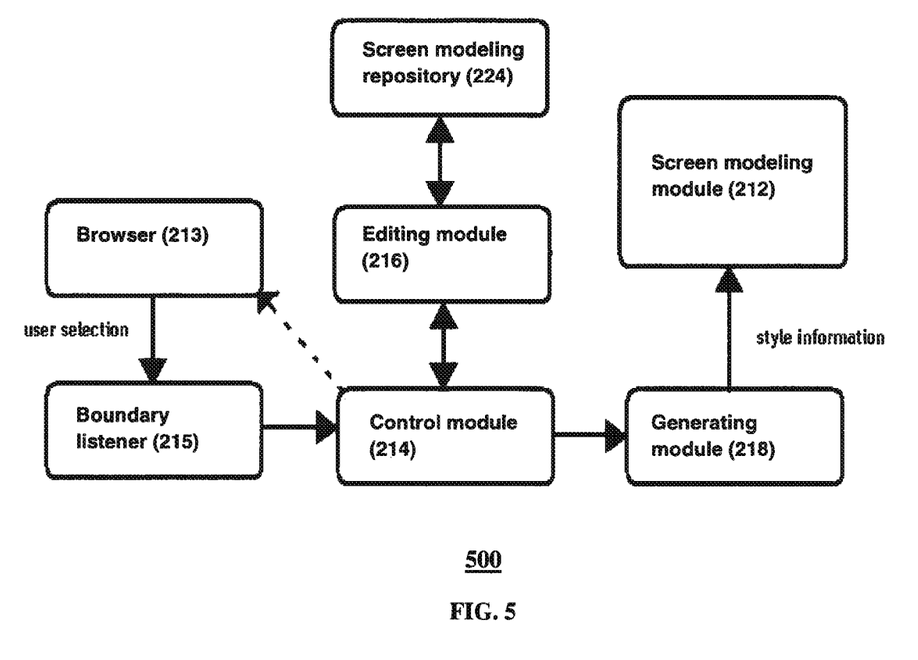
FIG. 5 illustrates an exemplary flow of data for designing the artifacts of a webpage in accordance with an embodiment of the present disclosure.

FIG. 3 is a flow chart illustrating an exemplary method 300 for designing artifacts in accordance with an embodiment of the present disclosure. Method 300 will be further described below. FIG. 4 is a flow chart illustrating an exemplary method 400 for designing artifacts of a webpage in accordance with an embodiment of the present disclosure. FIG. 5 illustrates an exemplary data flow 500 for designing the artifacts of a webpage in accordance with an embodiment of the present disclosure.

Referring to FIGS. 4 and 5, the system 102 may be implemented, for example, using a cascading style sheet (CSS) by using a model view controller (MVC) framework.

The user interface 204 may be configured to allow a user to select values of artifacts. In some embodiments, to modify or design the artifacts for further designing the webpage or the style specifications of the webpage, the user may press a key up and down to swap between or go through the available values of the artifacts. Via the user interface 204, the user may also provide or customize one or more boundary conditions of the artifacts to design the webpage. The boundary conditions may enable the designing of the webpage according to an HTML pattern of screen. The user may design or change the artifacts for designing or customizing the webpage with respect to the user's requirement.

The artifacts may further comprise, for example, one or more text patterns, colors, fonts, background images, background colors, borders, margins and padding height, width, etc.

Referring to FIG. 5, the screen modeling module 212 may identify a style pattern based on an HTML pattern of the webpage and the boundary conditions as specified by the user. These boundary conditions may be specified as, for example, a boundary listener (215). In some embodiments, the artifacts may be designed only for specific HTML patterns. As a result, if the HTML pattern is identified, the user may specify the boundary conditions and may work on any HTML patterns. The system 102 may provide boundary conditions such as a text box, a dropdown, etc. The boundary conditions may include a web control that is surrounded by at least one span/dive tag. The span/dive tag may include one or more label tags for the label placement or for a form section that includes a header and the web controls. Based on the exemplary boundary conditions, as described above, a user may define boundaries for activation of the editing module 216. If the user clicks on these portions of the boundaries, editing module 216 may be activated. Otherwise, editing module 216 may not be displayed or activated.

The control module 214 may be configured to control editing operations to be performed on the artifacts. The control module 214 may refer to a style specification provided by the user. The style specifications may be stored, for example, in a style modeling repository 214. In some embodiments, the editing operations may be controlled by controlling an activation and deactivation process of the editing operations.

The screen modeling module 212 may also assist in the functioning of the editing module 216. In some embodiments, the user may be required to define or specify the boundary listener 215 by providing boundary conditions based on the HTML pattern on a screen. In some embodiments, the editing module 216 may be able to understand the patterns based on the HTML pattern and the boundary conditions and may start its editing operations.

The editing module 216 may be activated on a particular section of the screen. The editing module 216 may be presented as small sections based on the HTML pattern of the screen. The presence of the editing module 216 on the various sections of the screen may also be specified by the user based on the boundary conditions.

In some embodiments, the editing module 216 may be a responsive editor. For example, if the user changes the style specifications by giving values of the artifacts and boundary conditions, the editing module 216 may generate a preview to display the corresponding changes on the screen in real time.

The editing module 216 may also support the browser compatibility. For example, if a user specifies one kind of style (e.g., values for artifacts), which may be specific to the editing module 216 of a particular browser, the editing module 216 may ensure, verify, or otherwise confirm that these changes can work on any browser (e.g., browser 213). The browser compatibility may be supported by a custom jquery plugin (e.g., from a JavaScript Library). The editing module 216 may address the browser compatibility if the user specifies the changes of the style. In some embodiments, the editing module 216 may store some or all browser-related specifications so that the specifications may be generated corresponding to the target browsers in the generating module 218. In some embodiments, this may be addressed in the editing module 216 because all the browser specifications may be injected while designing the editor.

The generating module 218 may render the design of the artifacts as an output based on the editing operations performed by the editing module 216. The output may be obtained in a form of a CSS file and may be modified according to the user's requirements.

Referring to FIG. 4, as an example, the user may design a wireframe of the screen by using the system 102. This may be performed via various modules. Such various modules may be implemented in terms of various models on the screen. The system 102 may translate language to provide a default appearance and feeling of the screen (step 400). The boundary conditions may be provided as an input to the editing module 216. For example, the editing module 216 or an editor can be required to be activated based on a specific HTML pattern. As a result, the user may have the flexibility to specify the boundary conditions of the artifacts for that specific HTML pattern. The system 102 may provide various controls (e.g., a text box, a dropdown, etc.) to enable all control boundaries such that the system 102 may work on any HTML pattern.

The user may decorate (step 402 and 404) the screen by using the editing module 216. The screen decorated may also be referred to as the actual decoration section or model. The actual decoration section or model may be the location of the screen where the user may start the decoration. A start/stop switch may also be provided to activate or deactivate the editing operations of the editing module 216. The start/stop switch (e.g., provided by the control module 214) may be used to activate the editing module 216 based on the boundary conditions and the style specifications as specified by the user.

As a part of an output (step 406), the generating module 218 may provide an output format. Based on the output specification, the style specification may be converted to the required format using translators. The specification of the output may be specified in the generating module 218. The specification of the output may correspond to, for example, CSS specifications of a JS (i.e., JavaScript) object. Some JS code may be able to understand and/or interpret the CSS specifications. As an example, if an HTML pattern has a "div" with a text box, the div may have some class with a defined style. Because it is uniquely identified from its text box, the style may be specified as a relative position to the text box and stored, for example, in the screen modeling repository 224. Because the pattern is specified in the boundary condition, the specified style specification may be automatically understood and displayed.

If the decorator style is converted to the required output format, the screen may start to render based on its new style specifications. In some embodiments, this may work on all the browsers that have multi-skin support (step 408).

FIG. 3 is a flow chart illustrating an exemplary method 300 for designing artifacts in accordance with an embodiment of the present disclosure. The order in which the method 300 is described is not intended to be construed as a limitation, and any number of the described method blocks may be combined in any order to implement the method 300 or alternate methods. Additionally, individual blocks may be deleted from the method 300 without departing from the spirit and scope of the subject matter described herein. Furthermore, the method 300 may be implemented in any suitable hardware, software, firmware, or combinations thereof. However, for ease of explanation, in the embodiments described below, the method 300 may be considered to be implemented in the above described system 102.

At step 302, the system 102 may allow a user to customize the webpage by selecting values of the artifacts and by specifying boundary conditions of the artifacts for an HTML pattern.

At step 304, a style pattern based on the HTML pattern of the webpage and the boundary conditions may be specified.

At step 306, editing operations to be performed on the artifacts may be controlled by referring to one or more style specifications as specified by the user.

At step 308, editing operations may be performed based on one or more the values of the artifacts, the style pattern, and the boundary conditions.

At step 310, the design of the artifacts may be obtained based on the editing operations that are performed.

The written description describes the subject matter herein to enable any person skilled in the art to make and use the embodiments of the present disclosure. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

I claim:

1. A system for customizing a web page by modifying or designing artifacts associated with a webpage, the system comprising:
    a user interface to enable a user to provide a style specification for a web page by providing values of artifacts of the web page, and providing one or more boundary conditions for design of the artifacts, wherein the artifacts comprises a text pattern, a color, a font, a background image, a background color, a border, a margin and padding height and width, and wherein the boundary conditions enable the designing of the webpage according to an HTML pattern of the web page, and wherein the user is enabled to design or change the artifacts for designing or customizing the webpage with respect to his requirements;
    one or more processors;
    a memory storing processor-executable instructions that, when executed by the one or more processors, configure the one or more processors to:
        automatically identify a style pattern based on an HTML pattern of the webpage and the one or more boundary conditions specified by the user;
        determine in real-time one or more editing operations to be performed on the one or more artifacts based on the style specification specified by the user, wherein the one or more editing operations are controlled by an activation or a deactivation of the one or more editing operations based on at least one of the style specification and the one or more boundary conditions;
        and
        automatically execute the one or more editing operations by processing the style pattern, the values of the artifacts and the one or more boundary conditions to render a design of the artifacts of the web page, meeting the style specification specified by the user, wherein executing the one or more editing operations comprises conversion of the style specification of the artifacts such that the changes to the design of the web page are compatible with multiple browser types associated with the webpage.

2. The system of claim 1, wherein the processor-executable instructions further configure the one or more processors to display in real-time a preview of the design of the webpage with respect to, the one or more editing operations so executed.

3. The system of claim 1, wherein the boundary conditions include a web control that is surrounded by a span/div tag, wherein the span/div tag includes one or more label tags for label placement or a form section that includes a header and the web control.

4. A method for customizing a web page by modifying or designing artifacts associated with the web page, the method comprising a processor implemented method comprising:
    receiving via a user interface style specification for a web page by receiving at least one of one or more values of one or more artifacts of the web page and one or more boundary conditions for designing the one or more artifacts specified by a user, wherein the artifacts comprise a text pattern, a color, a font, a background image, a background color, a border, a margin and padding height and width, and wherein the boundary conditions enable the designing of the webpage according to an HTML pattern of the web page, and wherein the user is enabled to design or change the artifacts for designing or customizing the webpage with respect to his requirements;
    automatically identifying, by one or more processors, a style pattern based on an HTML pattern of the webpage and the one or more boundary conditions specified by the user;
    determining in real-time, by the one or more processors, one or more editing operations to be performed on the one or more artifacts based on the style specification specified by the user, wherein the one or more editing operations are controlled by an activation or a deactivation based on at least one of the style specification and the one or more boundary conditions;
    and
    executing the one or more editing operations, by the one or more processors, by processing the style pattern, the values of the one or more artifacts and the one or more boundary conditions to render the design of the one or more artifacts of the web page, meeting the style specification specified by the user, wherein executing the one or more editing operations comprises conversion of the style specification of the artifacts such that the changes to the design of the web page are compatible with multiple browser types associated with the webpage.

5. The method of claim 4, further comprising displaying in real-time a preview of the design of the webpage with respect to, by the one or more processors, the one or more editing operations so determined on the artifacts based on user specified values associated with at least one of the artifacts, the style pattern, and the one or more boundary conditions.

6. The method of claim 4, wherein the boundary conditions include a web control that is surrounded by a span/div tag, wherein the span/div tag includes one or more label tags for label placement or a form section that includes a header and the web control.

7. A non-transitory computer program product having embodied thereon computer program instructions for executing a method for customizing a web page by modifying or designing artifacts associated with a webpage, the computer program instructions comprising instructions for configuring a processor to perform the method comprising:
   receiving via an user interface style specification for a web page by receiving at least one of one or more values of one or more artifacts of the web page and one or more boundary conditions for designing the one or more artifacts specified by a user, wherein the artifacts comprises a text pattern, a color, a font, a background image, a background color, a border, a margin and padding height and width, and wherein the boundary conditions enable the designing of the webpage according to an HTML pattern of the web page, and wherein the user is enabled to design or change the artifacts for designing or customizing the webpage with respect to his requirements;
   automatically identifying a style pattern based on an HTML pattern of the webpage and the one or more boundary conditions specified by the user;
   determining in real-time, one or more editing operations to be performed on the one or more artifacts based on the style specification specified by the user, wherein the one or more editing operations are controlled by an activation or a deactivation based on at least one of the style specification and the one or more boundary conditions;
   and
   executing the one or more editing operations by processing the style pattern, the values of the one or more artifacts and the one or more boundary conditions, to render the design of the artifacts of the web page, meeting the style specification specified by the user, wherein executing the one or more editing operations on the artifacts comprises conversion of the style specification of the one or more artifacts such that the changes to the design of the web page are compatible with multiple browser types associated with the webpage.

8. The computer program product of claim 7, wherein the computer program instructions comprising further instructions for configuring the processor to perform operations comprising: displaying in real-time a preview of the design of the webpage with respect to, by the one or more processors, the one or more editing operations so determined on the artifacts based on user specified values associated with at least one of the artifacts, the style pattern, and the one or more boundary conditions.

9. The computer program product of claim 7, wherein the boundary conditions include a web control that is surrounded by a span/div tag, wherein the span/div tag includes one or more label tags for label placement or a form section that includes a header and the web control.

* * * * *